(12) United States Patent
Cheng

(10) Patent No.: US 6,869,105 B2
(45) Date of Patent: Mar. 22, 2005

(54) FOUR-POINT SEAT RESTRAINT

(75) Inventor: Ching-Shan Cheng, Canton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/366,979

(22) Filed: Feb. 14, 2003

(65) Prior Publication Data

US 2004/0160051 A1 Aug. 19, 2004

(51) Int. Cl.[7] .............................................. B60R 22/06
(52) U.S. Cl. ...................................... 280/804; 280/808
(58) Field of Search ................................ 280/802, 803, 280/804, 801.1, 808; 297/469, 473, 484

(56) References Cited

U.S. PATENT DOCUMENTS

| | | | |
|---|---|---|---|
| 3,713,693 A | | 1/1973 | Cadiou |
| 3,842,929 A | * | 10/1974 | Wada et al. ................. 280/804 |
| 4,213,652 A | * | 7/1980 | Irwin et al. .................. 297/478 |
| 4,231,592 A | | 11/1980 | Scherenberg et al. |
| 4,258,933 A | * | 3/1981 | Takada ........................ 280/804 |
| 4,274,657 A | * | 6/1981 | Johnson et al. ............. 280/803 |
| 4,437,684 A | * | 3/1984 | Moriya et al. .............. 280/804 |
| 4,832,367 A | | 5/1989 | Lisenby |
| 5,005,867 A | * | 4/1991 | Sandvik et al. ............. 280/804 |
| 5,123,673 A | | 6/1992 | Tame |
| 5,149,133 A | * | 9/1992 | Alvarado .................... 280/804 |
| 5,215,333 A | | 6/1993 | Knight |
| 5,692,781 A | | 12/1997 | Lee |
| 6,056,366 A | | 5/2000 | Haynes et al. |
| 6,139,111 A | | 10/2000 | Pywell et al. |
| 6,179,329 B1 | | 1/2001 | Bradley |
| 6,305,713 B1 | | 10/2001 | Pywell et al. |
| 6,375,270 B1 | | 4/2002 | Sullivan et al. |
| 6,786,510 B2 | * | 9/2004 | Roychoudhury et al. ... 280/802 |
| 2002/0089164 A1 | * | 7/2002 | Rouhana et al. ......... 280/801.1 |
| 2004/0036270 A1 | * | 2/2004 | Roychoudhury et al. ... 280/802 |

FOREIGN PATENT DOCUMENTS

| | | |
|---|---|---|
| EP | 1 116 633 A2 | 7/2001 |
| WO | WO 02/22406 A1 | 3/2002 |

* cited by examiner

Primary Examiner—David R. Dunn
(74) Attorney, Agent, or Firm—Kathryn A. Marra

(57) ABSTRACT

A four-point seat belt system is provided which includes a seat mountable within the vehicle, the seat has upper and lower medial locations. A first seat belt is disclosed having a first end coupled to the lower medial location and a second end coupled to the upper medial location. The seat belt further has a first tongue disposed between the first and second ends. A second seat belt is provided which has a first end coupled to the lower medial location and a second end having a second tongue. A first track located on the vehicle's door is provided which has a first seat belt buckle and a first drive mechanism. A second track is provided on the vehicle's door frame which has a second seat belt buckle. The first drive mechanism is configured to move at least one of the first seat belt buckle or the second seat belt buckle from a first location to a second location.

21 Claims, 3 Drawing Sheets

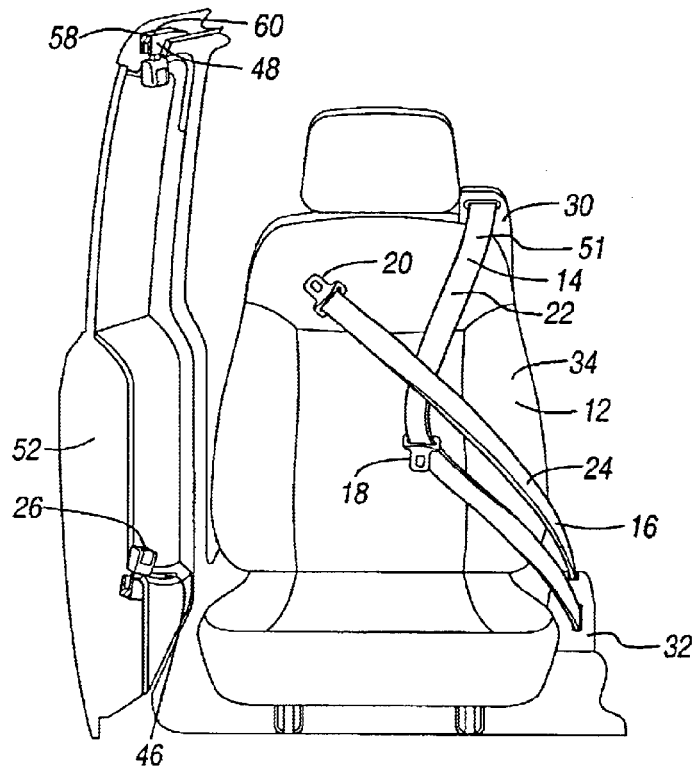
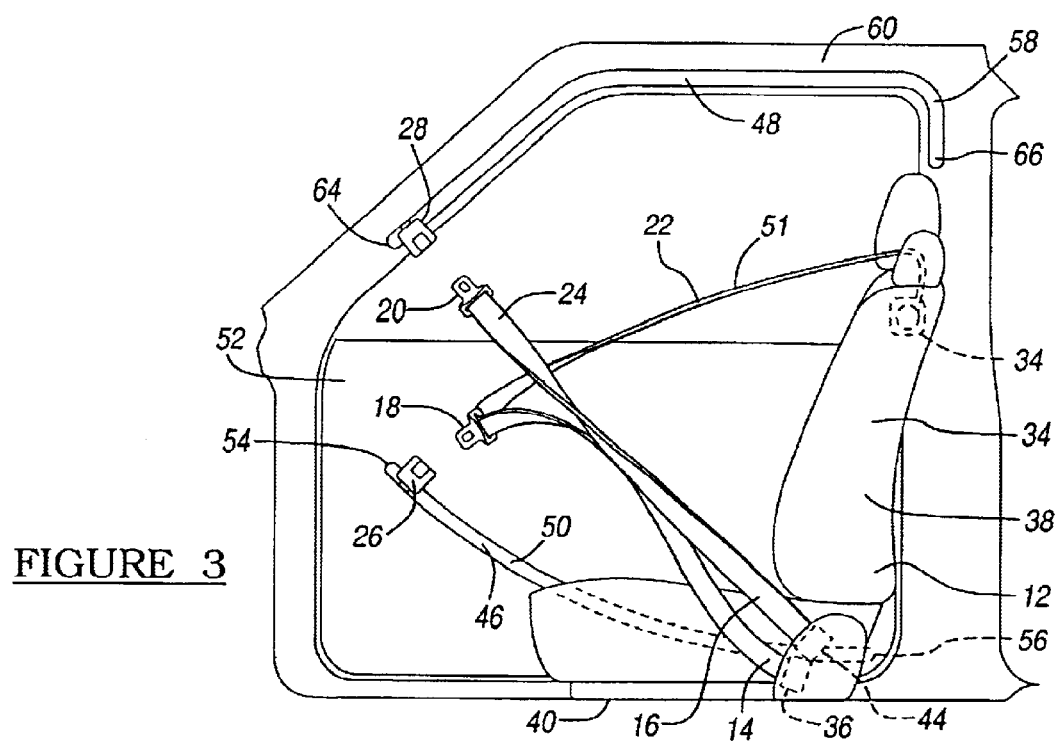
FIGURE 2
FIGURE 3

FOUR-POINT SEAT RESTRAINT

FIELD OF THE INVENTION

The present invention relates to an apparatus for restraining an occupant in an automotive vehicle seat during rapid deceleration. More particularly, the invention relates to a four-point seat mounted restraint apparatus.

BACKGROUND OF THE INVENTION

It is known in the automotive vehicle art to provide various types of seat belts or restraint apparatus for restraining an occupant in the seat and providing controlled deceleration of portions of the body to limit the forces applied to the occupant's body during rapid deceleration of a vehicle from a cause such as a collision. Four-point restraint apparatus are among the many types provided for use in various types of vehicles.

SUMMARY OF THE INVENTION

The present invention provides a four-point seat-mounted restraint apparatus designed to reduce and distributed forces applied to the body of an occupant during rapid deceleration conditions.

In a preferred form, and apparatus according to the invention includes a seat mountable within the vehicle, a first seat belt is provided having a first end coupled to a lower medial location of the seat and a second end coupled to the upper medial location of the seat. A slip tongue is disposed between the first and second ends of the first seat belt. A second seat belt is provided which has a first end coupled to the lower medial location and a second end having a second tongue. A pair of tracks are provided which have seat belt buckles. The drive mechanism is configured to move at least one of the seat belt buckles from a first location to a second location.

In an alternate embodiment, an apparatus for restraining an occupant within a vehicle is provided that has a seat having a seat mounted seat belt retractor. A seat belt is coupled to the seat mounted seat belt retractor at one end and is coupled to a lower medial location of the seat at its other end. A second seat belt is provided which couples a second buckle to the lower medial location. Provided are a first track having a first buckle configured to be moved from a first fore location to a first aft location, and a second track having a second buckle, configured to be moveable from a second fore location to a second aft location.

In yet another embodiment of the invention, a restraint system is provided which has a seat having a seat mounted seat belt retractor. A first seat belt having a first tongue is coupled to the seat mounted seat belt retractor and a lower medial seat location. A second seat belt having a second tongue is coupled to the medial lower seat location. A first track having a first buckle configured to be moved from a first fore location to a first aft location, and a second track having a second buckle, configured to be moveable from a second fore location to a second aft location are provided. The first track is located upon a vehicle door and is actuatable upon the closing of the door, while the second track is located on the vehicle's door frame. The first buckle is configured to be coupled to the first tongue, while the second buckle is configured to be coupled to the second tongue.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 2 and 3 depict front and side views of the restraint system in FIG. 1 in an unengaged condition;

DETAILED DESCRIPTION OF THE PREFERRED EMBODIMENTS

Figure 1:
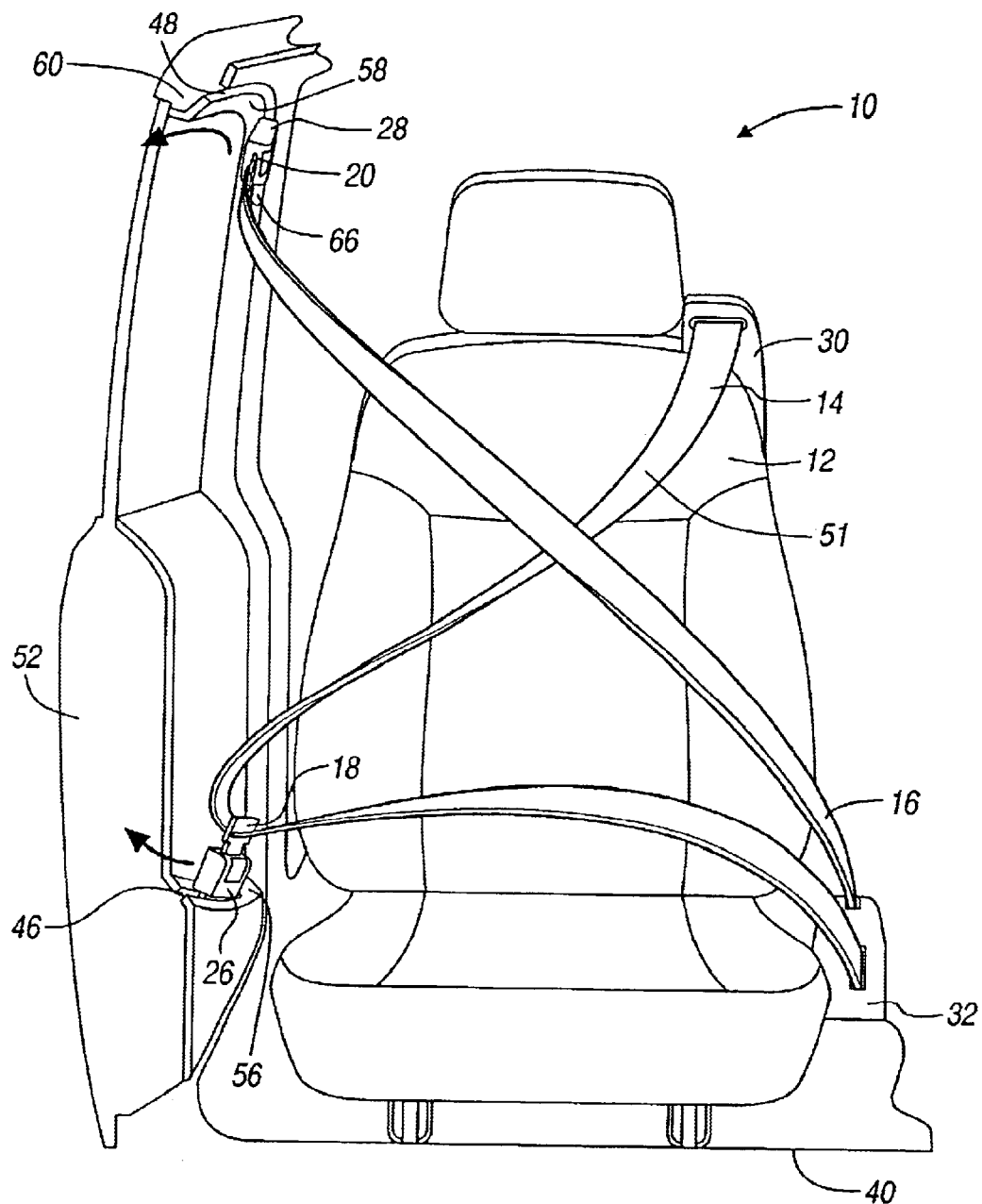
FIG. 1 represents a front view of the restraint system according to the teachings of the present invention.

The following description of the preferred embodiments is merely exemplary in nature and is in no way intended to limit the invention, its application, or uses.

Referring generally to FIGS. 1–5 which show a restraint system 10 according to the teachings of the present invention. The system 10 is shown utilizing a vehicle left front seat 12 and first and second seat belts 14 and 16. Coupled to the seat belts 14 and 16 are first and second tongues 18 and 20, which are coupled to the webbing 22 and 24 of seat belts 14 and 16. The tongues 18 and 20 are configured to be coupled to first and second seat belt buckles 26 and 28. The first seat belt 14 is coupled at its first and second ends 27 and 29 to upper and lower medial locations 30 and 32 on a medial side 33 of the seat 12. The lower medial location 32 is located generally below or at the occupant's hip-point, and can be on the vehicle seat 12 or the vehicle floor 40. Disposed between the first and second ends 27 and 29 is the first tongue 18, which is coupled to the webbing 22 utilizing a slip tongue slot 35.

Disposed at either one or both of the upper and lower medial locations 30 and 32 are first and second seat belt retractors 34 and 36. The upper medial location 30 can have either a fixed mounting point which couples the webbing 22 to the seat frame (not shown) or a seat integrated retractor. In this regard, the seat integrated retractor can be located at the upper medial location 30 or, alternatively, can be mounted at a second lower location 38, which is closer to a seat vehicle floor interface. In this regard, should the seat integrated retractor be located at the second lower location 38, a webbing D-ring (not shown) must be used at the upper medial location 30 to facilitate the movement of the webbing 22.

Located at the lower medial location 32 is either a fixed mounting point or a second seat belt retractor 36. The second retractor 36 can be mounted to the vehicle seat 12 or, alternatively, can be mounted to the vehicle's floor 40.

The second seat belt 16 is coupled at its first end 42 to a third retractor 44 located at the lower medial location 32. Coupled to a second end 45 of the webbing 24 is a second tongue 20. The second tongue 20 is sewn in a non-sliding fashion to the webbing 24.

The first, second, and third retractors 34, 36, and 44 are of the emergency locking type. Generally, the retractors 34, 36, and 44 take the form of a spring-loaded spool mounted to a frame. A blocking member, which is coupled to the frame, is configured to prevent rotation of the webbing 22 or 24 during a deceleration event. A pair of sensors is coupled to the blocking member which actuate the blocking mechanism either at a predetermined vehicle deceleration level or upon the extraction of the webbing 22 or 24 at a predetermined rate. With respect to the single point mounting of the webbing 22 or 24, a bracket (not shown) is sewn to the webbing 22 or 24 and fixed to the vehicle using a standard hardened bolt. It is envisioned that the retractors 34, 36, and 44 additionally can have pre-tensioning and energy absorbing structures.

Figure 4:
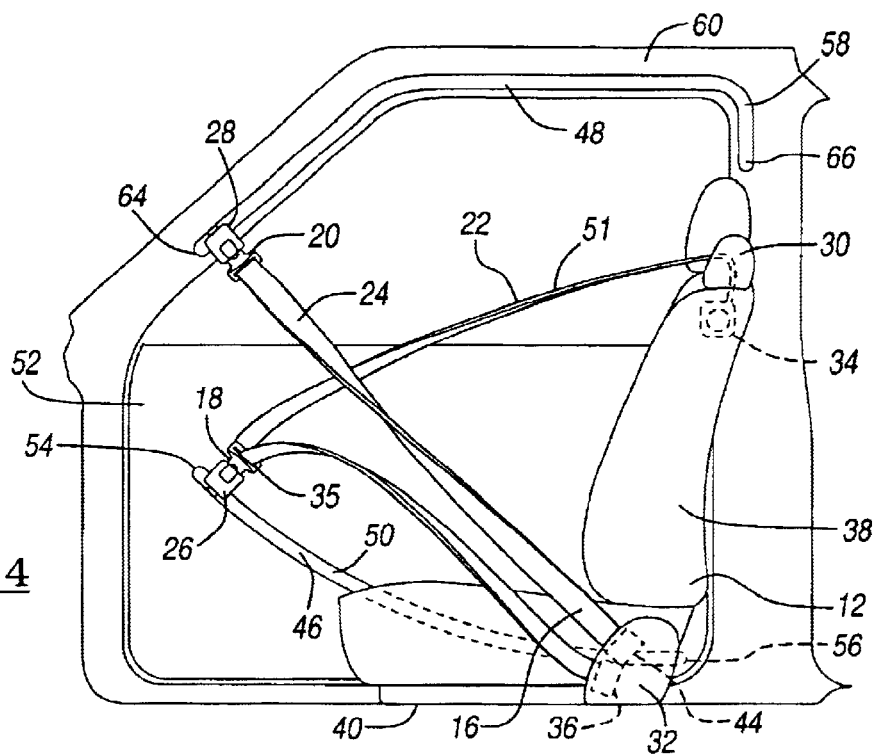
FIG. 4 represents a side view of the restraint system in FIG. 1 shown in an unretracted position.

Referring to FIGS. 3 and 4, the first and second buckles 26 and 28 are coupled to first and second seat belt rails 46 and 48. The first rail 46 is in the form of a generally arcuate slot 50 defined within the vehicle's door 52. The first rail 46 has a first drive mechanism (not shown) which functions to move the location of the first buckle 26 from a first fore location 54 of the first rail 46 to an aft location 56. The aft location 56 is generally located at a lower lateral position 57 adjacent to or about the occupant's hip point.

The second rail 48 is defined by a second track 58 positioned along a top portion 60 of the door frame 62. The second rail 48 has a second drive mechanism (not shown) which functions to move the second buckle 28 from a second fore location 64 generally in front of the vehicle door 52, second aft location 66 generally aft of the vehicle door 52.

Each of the fore locations 54 and 64 are positioned such that an occupant can enter or exist the vehicle seat 12 without being obstructed by the first or second belts 14 and 16. Upon the closing of the vehicle door 52, both the first and second drive mechanisms move the first and second buckles 26 and 28 from the fore locations 54 and 64 to the aft locations 56 and 66. It should be noted that both aft locations 56 and 66 are configured to fixably restrain the seat belt buckles 26 and 28 during a deceleration event.

As can be seen in FIG. 4, the first and second seat belt tongues 18 and 20 can be coupled to the first and second buckles 26 and 28 when the buckles 26 and 28 are in the fore locations 54 and 64. Additionally, the tongues 18 and 20 can be coupled to the buckles 26 and 28 when the buckles 26 and 28 are in the aft locations 56 and 66. The system 10 is specifically configured that an occupant need not decouple the tongues 18 and 20 from the first and second buckles 26 and 28 to facilitate ingress or egress of the occupant from the vehicle.

Figure 5:
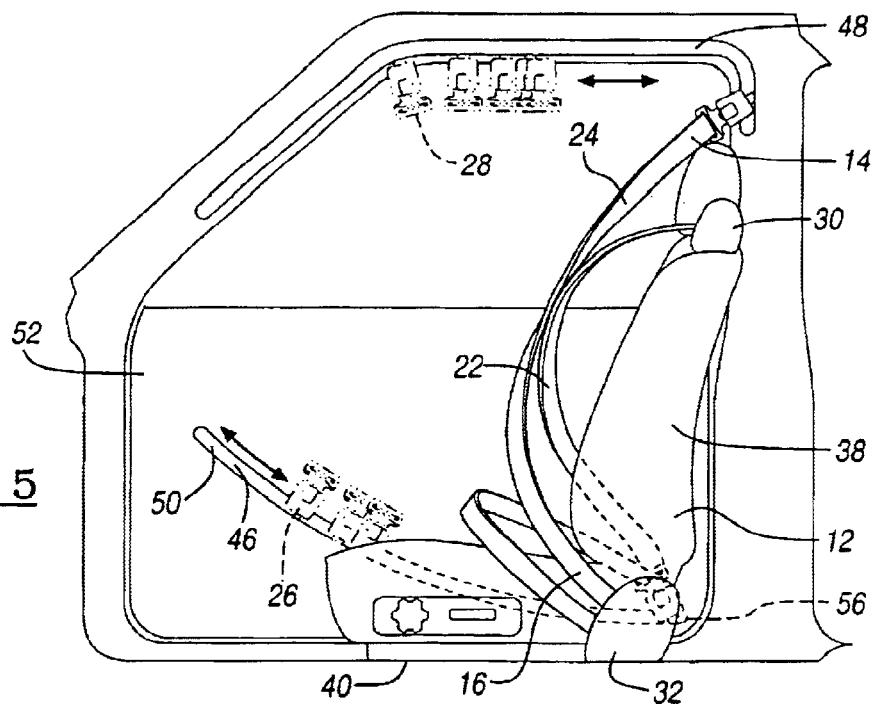
FIG. 5 represents a side view of the restraint system shown in FIG. 1 in a retracted position.

FIG. 5 represents a side view of the function of the system 10. Upon entering a vehicle, the occupant seated on a vehicle seat 12 closes the vehicle's door 52. The first and second drive mechanisms move the first and second buckles 26 and 28 to aft locations 56 and 66. While the buckles 26 and 28 are being retracted, the retractors 34, 36, and 44 function to apply tension to the first and second seat belts 14 and 16, while allowing the belt length to increase through the rotation of the retractor's spool.

The first seat belt 14 defines a torso portion 51 between the first tongue 18 and the upper medial location 30 which is configured to pass closely adjacent the neck portion and across the clavicle of the occupant downward across the front edge portion of the occupant's rib cage. The first belt further defines a second portion from the first tongue 18 to the lower medial location 32 which functions to restrain the occupant's pelvis. The second seat belt is configured to pass closely to and adjacent a lateral side of the neck portion and across the occupant's lateral clavicle and extend downward across the edge portion of the occupant's rib cage to the lower medial location 32.

The description of the invention is merely exemplary in nature and, thus, variations that do not depart from the gist of the invention are intended to be within the scope of the invention. Such variations are not to be regarded as a departure from the spirit and scope of the invention. For example, it is possible to modify the previously described system so that one may use a single track which would necessitate the occupant to manually insert one or both of the tongues 18 or 20 into a buckle fixed at locations 56 or 66.

What is claimed is:

1. An apparatus for restraining an occupant within a vehicle comprising:
   a seat, mountable within the vehicle, the seat having upper and lower medial locations;
   a first seat belt having a first end coupled at the lower medial location and a second end coupled at the upper medial location, said seat belt further having a first tongue disposed between the first and second ends;
   a second seat belt having a first end coupled at the lower medial location, the second seat belt having a second end having a second tongue;
   a first track having a first seat belt buckle and a first drive mechanism; and
   a second track having a second seat belt buckle, wherein said first drive mechanism is configured to move at least one of the first seat belt buckle or the second seat belt buckle from a first location to a second location, wherein the apparatus is a passive restraint system which automatically provides a four-point restraint system upon the closing of a vehicle door.

2. The apparatus according to claim 1 further comprising a seat belt retractor locating at one of the upper or lower medial locations.

3. The apparatus according to claim 1 further comprising a first seat belt retractor at the upper medial location and a second seat belt retractor located at the lower medial location.

4. The apparatus according to claim 1 further comprising a second seat belt retractor at the lower medial position coupled to the first seat belt.

5. The apparatus according to claim 1 further comprising a third seat belt retractor coupled to the second seat belt, the third seat belt retractor being located at the lower medial location.

6. The apparatus according to claim 1 wherein the first seat belt forms a torso portion and a lap portion.

7. The apparatus according to claim 6 wherein the second seat belt defines a torso portion.

8. The apparatus according to claim 1 wherein the first track is coupled to a vehicle door.

9. The apparatus according to claim 1 wherein the second track is coupled to a vehicle door frame.

10. The apparatus according to claim 8 wherein the first drive mechanism functions to move the first seat belt buckle from a first location to a second location along the first track upon the closing of the vehicle door.

11. The apparatus according to claim 9 wherein the second track has a second drive mechanism configured to move the second seat belt buckle from a third location to a fourth location along the second track.

12. The apparatus according to claim 1 further comprising an emergency locking retractor coupled to the first belt.

13. The apparatus for restraining an occupant within a vehicle comprising:
   a seat having a first seat mounted seat belt retractor;
   a first seat belt having a first end which is coupled to the first seat mounted seat belt retractor, the first seat belt having a first tongue and a second end coupled to a lower medial location;

a second seat belt having a first end coupled to the lower medial location, the second seat belt having a second end having a second tongue;

a first track having a first buckle configured to be moved from a first fore location to a first aft location, said first buckle being configured to be coupled to the first tongue; and a second track having a second buckle configured to be moveable from a second fore location to a second aft location, said second buckle being configured to be coupled to the second tongue, wherein the apparatus is a passive restraint system which is coupled to the vehicle at four points.

14. The apparatus according to claim 13 wherein the first belt defines a torso portion and a lap portion.

15. The apparatus according to claim 13 further comprising a second retractor located at the lower medial location.

16. The apparatus according to claim 15 wherein the second retractor is mounted to the seat.

17. The apparatus according to claim 13 wherein the lower medial location is located on a vehicle floor.

18. The apparatus according to claim 13 wherein the first track is located upon a vehicle door, the first track having a drive mechanism which is actuatable upon the closing of the door, the actuation of the drive mechanism moving the first seat belt buckle from the first fore location to the first aft location.

19. The apparatus according to claim 18 wherein the second track is located upon a vehicle door frame and has a second drive mechanism which is configured to move the second buckle from the second fore location to the second aft location upon the closing of the vehicle door.

20. The apparatus according to claim 19 wherein the first and second drive mechanisms are configured to be actuatable upon the opening of the vehicle door.

21. A four-point restraint apparatus for restraining an occupant within a vehicle comprising:

a seat having a first seat mounted seat belt retractor;

a first seat belt having a first end which is coupled to the first seat mounted seat belt retractor, the first seat belt having a first tongue and a second end coupled to a medial lower location;

a second seat belt having a first end coupled to the medial lower location, the second seat belt having a second end having a second tongue;

a first track having a first buckle configured to be moved from a first fore location to a first aft location, the first track being located upon a vehicle door and having a drive mechanism which is actuatable upon the closing of the door, the actuation of the drive mechanism moving the first seat belt buckle from the first fore location to the first aft location; and a second track having a second buckle which is configured to be moveable from a second fore location to a second aft location, the second track is located upon a vehicle door frame and has a second drive mechanism which is configured to move the second buckle from the second fore location to the second aft location upon the closing of the vehicle door to form the four-point restraint apparatus.

* * * * *